United States Patent
Burns et al.

(10) Patent No.: US 10,137,391 B2
(45) Date of Patent: Nov. 27, 2018

(54) ENHANCED FILTER SUPPORT BASKET

(75) Inventors: David J. Burns, Mineral Wells, TX (US); Daniel M. Cloud, Weatherford, TX (US); Tyler Glenn Boswell, Wetherford, TX (US); Artimus Charles Jones, Benbrook, TX (US)

(73) Assignee: PECOFacet (US), Inc., Franklin, TN (US)

(*) Notice: Subject to any disclaimer, the term of this patent is extended or adjusted under 35 U.S.C. 154(b) by 856 days.

(21) Appl. No.: 13/231,304

(22) Filed: Sep. 13, 2011

(65) Prior Publication Data

US 2013/0062273 A1    Mar. 14, 2013

(51) Int. Cl.
| | | |
|---|---|---|
| *B01D 35/02* | (2006.01) | |
| *B23P 6/00* | (2006.01) | |
| *B01D 29/52* | (2006.01) | |
| *B01D 29/96* | (2006.01) | |

(52) U.S. Cl.
CPC ............ *B01D 29/52* (2013.01); *B01D 29/96* (2013.01); *B01D 2201/043* (2013.01); *B01D 2201/0453* (2013.01); *B01D 2201/291* (2013.01); *B01D 2201/34* (2013.01); *Y10T 29/49718* (2015.01)

(58) Field of Classification Search
CPC ............ B01D 46/0005; B01D 2201/24; B01D 2201/34; B01D 2271/027; B01D 46/4227; B01D 2201/0453; B01D 2201/043; B01D 2201/291; B01D 29/52; B01D 29/96
USPC ................................ 210/345, 450; 29/402.01
See application file for complete search history.

(56) References Cited

U.S. PATENT DOCUMENTS

| | | | | |
|---|---|---|---|---|
| 1,833,823 | A | * 11/1931 | Buckner | 99/296 |
| 2,795,195 | A | 6/1957 | Amblard et al. | |
| 3,353,678 | A | 11/1967 | Dragon | |
| 3,422,958 | A | * 1/1969 | Newman | 210/333.01 |
| 3,888,644 | A | * 6/1975 | Holland et al. | 55/318 |
| 4,298,474 | A | 11/1981 | Sillers, Jr. | |
| 4,552,669 | A | 11/1985 | Sekellick | |
| 4,560,483 | A | * 12/1985 | Warning et al. | 210/777 |
| 4,713,174 | A | * 12/1987 | Zievers et al. | 210/233 |
| 4,997,564 | A | 3/1991 | Herczeg | |
| 5,128,037 | A | 7/1992 | Pearl et al. | |
| 5,453,116 | A | 9/1995 | Fischer et al. | |
| 5,571,298 | A | 11/1996 | Buck | |

(Continued)

FOREIGN PATENT DOCUMENTS

| | | |
|---|---|---|
| EA | 002874 B1 | 10/2002 |
| FR | 2645234 A1 | 10/1990 |

(Continued)

OTHER PUBLICATIONS

Oxford Dictionary, "The Concise Oxford Dictionary," 10th ed., ed. Judy Pearsall, pub. Oxford University Press, New York, 1999, 3 pages.*

(Continued)

*Primary Examiner* — Bobby Ramdhanie
*Assistant Examiner* — Denise E Anderson
(74) *Attorney, Agent, or Firm* — Reinhart Boerner Van Deuren P.C.

(57) ABSTRACT

A filtration vessel is provided with improved sealing surfaces and alignment methods. The sealing surface is provided by a perforated sleeve within the filtration vessel. An alignment mechanism is provided which allows for improved servicing of the filtration vessel.

17 Claims, 8 Drawing Sheets

(56) References Cited

U.S. PATENT DOCUMENTS

| | | |
|---|---|---|
| 5,571,598 A | 11/1996 | Butler et al. |
| 5,873,918 A | 2/1999 | Dillman et al. |
| 5,919,284 A | 7/1999 | Perry, Jr. et al. |
| 6,168,647 B1 | 1/2001 | Perry, Jr. et al. |
| 6,338,797 B1* | 1/2002 | Nurse, Jr. .............. B01D 29/35 210/238 |
| 6,764,598 B2 | 7/2004 | Yu et al. |
| 7,208,088 B2 | 4/2007 | Almasian et al. |
| 7,285,209 B2 | 10/2007 | Yu et al. |
| 7,294,163 B1 | 11/2007 | LaCroix |
| 7,410,581 B2 | 8/2008 | Arnold et al. |
| 2005/0145707 A1* | 7/2005 | Leni ................................ 238/14 |
| 2006/0065601 A1 | 3/2006 | Baird |
| 2006/0207426 A1* | 9/2006 | Platt et al. ...................... 95/286 |
| 2008/041026 A1 | 2/2008 | Engel et al. |
| 2009/0107905 A1 | 4/2009 | Schmitt |
| 2010/0000934 A1 | 1/2010 | Brown |
| 2010/0294712 A1 | 11/2010 | Abdalla et al. |

FOREIGN PATENT DOCUMENTS

| | | |
|---|---|---|
| WO | WO 97/24169 A2 | 10/1997 |
| WO | WO 98/33578 A1 | 8/1998 |
| WO | WO 00/50825 A1 | 8/2000 |
| WO | WO 2005/077491 A1 | 8/2005 |

OTHER PUBLICATIONS

U.S. Appl. No. 13/190,192, Burns et al., filed Jul. 26, 2011.

* cited by examiner

ENHANCED FILTER SUPPORT BASKET

FIELD OF THE INVENTION

This invention generally relates to filter systems, and in particular to filtration vessels, and methods for servicing the same.

BACKGROUND OF THE INVENTION

Fluid streams such as liquid flows and gaseous flows (e.g. air flows) often carry particulates that are often undesirable contaminants entrained in the fluid stream. Filters are commonly employed to remove some or all of the particulates from the fluid stream. Filtration vessels having one or more filters, often arranged in parallel circuit provide a known way to filter a high volume of fluid. Typically, a filtration vessel includes a filter support structure disposed within an outer housing, which may be adapted to provide radial and axial support to filter elements during operation.

Large filtration vessels currently known in the art are costly to manufacture and maintain due to the size of the components and their inaccessibility within the outer housing. When components in the filtration vessel are imperfectly manufactured, a sealing relationship between a filter element and the filtration vessel is difficult to maintain. This may result in contaminated fluid bypassing the filters. To attempt to avoid such bypass, often manufacturers will precisely machine holes in the solid and thick walled partition plate of such housings, but even with such additional machining operations, the machined holes can become damaged during prolonged use.

The invention provides improvements over the prior art relating to filtration vessels and methods for servicing the same. These and other advantages of the invention, as well as additional inventive features, will be apparent from the description of the invention provided herein.

BRIEF SUMMARY OF THE INVENTION

In one aspect, a filtration vessel is provided. The filtration vessel includes an outer housing which defines a filtration chamber. The outer housing has an inlet port and an outlet port, with fluid flow from the inlet port to the outlet port. The filtration vessel further comprises a partition plate disposed within the outer housing, which divides the filtration chamber into an inlet chamber and an outlet chamber. The inlet chamber communicates with the inlet port, and the outlet chamber communicates with the outlet port. The partition plate defines a hole, and a sleeve is mounted in the hole. The sleeve has a solid ring portion lining the hole, which provides a radial seal surface. The filtration vessel further comprises a filter element, which is removably installed into the sleeve. The filter element has a seal, which seals radially against the radial seal surface.

A filtration vessel that provides a radial seal on the perforated sleeve has many advantages over the prior art. For reasons that will be discussed in more detail below, the partition plate may be manufactured from a thinner material, and the holes may be formed with inexpensive manufacturing techniques such as stamping or torch cutting.

In a preferred embodiment, a plurality of holes, perforated sleeves, and filter elements are provided. Each perforated sleeve mounts in a hole, and each filter element mounts in a sleeve. In this embodiment, a plurality of filter elements may be arranged in parallel circuit, such that fluid to be filtered flows in through the inlet port to the inlet chamber, through the holes and into the filter elements and out into the outlet chamber and through the outlet port.

In preferred embodiments, the partition plate may be between 0.375 inches and 2.675 inches. Preferably, the partition plate is less than 1.5 inches for many applications.

Also preferably, the seal has an annular sealing flange and an annular base portion and may be a "chevron" type seal. The annular base portion is carried by a first end cap of the filter element, and the annular sealing flange has an annular terminating end. In one embodiment, the annular terminating end is spaced radially inside an inner peripheral surface of the first end cap. In an alternative embodiment, the annular terminating end is spaced radially outside an outer peripheral surface of the first end cap. The seal is elastomeric, and has sufficient resiliency and flexibility to conform and seal to a non-round opening with up to at least 0.01 inches in a diameter variance from round.

More preferably, the seal conforms to a generally round opening having a diameter up to at least 0.125 inches outside a design diameter of the radial seal surface. Also preferably, the seal conforms to a non-round opening with up to at least 0.25 inches in a diameter variance from round. These various sealing characteristics allow the filter element to seal to an imperfectly and inexpensively manufactured radial sealing surface provided by the perforated sleeve, thereby advantageously reducing the manufacturing costs of the filtration vessel.

In another preferred embodiment, an annular weld is formed between the solid ring portion and the partition plate, thereby mounting and sealing the perforated sleeve in the hole. In a preferred embodiment, the solid ring portion of the perforated sleeve extends between 1.5 inches and 2.5 inches along an axial length of the perforated sleeve. Also in a preferred embodiment, the filter element has an outer diameter of between 2 inches and 10 inches, and a length of between 4 inches and 80 inches. Also in a preferred embodiment, the perforated sleeve is made from stainless steel having a gauge of between 14 and 20. More preferably, the perforated sleeve is made from 16 gauge stainless steel.

In another preferred embodiment, the filtration vessel further comprises a back support grid. The back support grid defines a first alignment structure, and the perforated sleeve defines a second alignment structure. The first alignment structure receives the second alignment structure, thereby helping to align the perforated sleeve between the partition plate and the back support grid. In a preferred embodiment the first and second alignment structures are threaded, such that the perforated sleeve screws into the back support grid. In a more preferred embodiment, a flat gasket is provided, which provides an axial seal between a flange of the perforated sleeve and the partition plate.

In another preferred embodiment, the hole in the partition plate is formed with one of the methods of stamping, torching, and cutting on a water jet. Because the perforated sleeve provides a radial sealing surface, an inner peripheral surface of the hole does not need to be perfectly round. Therefore more inexpensive manufacturing methods such as the ones mentioned above are preferred to be used.

In another aspect, a filtration vessel is provided. The filtration vessel comprises an outer housing, which defines a filtration chamber. The outer housing has an inlet port and an outlet port. The filtration vessel further comprises a partition plate, which divides the filtration chamber into an inlet chamber and an outlet chamber. The inlet chamber communicates with the inlet port, and the outlet chamber communicates with the outlet port. The filtration vessel further comprises a back support grid. The partition plate defines a hole, and a perforated sleeve is mounted in the hole and fastened thereto or to the back support grid. The back support grid defines a first alignment structure, which is aligned with the hole in the partition plate. The perforated sleeve defines a second alignment structure, which removably engages the first alignment structure. The alignment structures thus serve to align the perforated sleeve between the partition plate and the back support grid. The filtration vessel further comprises a filter element removably installed into the perforated sleeve.

This aspect provides improvements over the prior art with regard to access to the components within the filtration vessel. The removably engaging alignment structures allow a perforated sleeve to be removed from the filtration vessel through a hole, without having to cut open the filtration vessel to access the back support grid.

In a preferred embodiment, the first alignment structure is an alignment hole and the second alignment structure is a projection extending from a body of the perforated sleeve. More preferably, the projection is hollow, and defines a through hole extending through the body of the perforated sleeve and through the projection. In one embodiment, the perforated sleeve is securely fastened in the hole in the partition plate by an annular weld.

In an alternative embodiment, the projection and the alignment hole are threaded, such that the projection may be screwed into the alignment hole, and a flat gasket seals the perforated sleeve to the partition plate. In this embodiment, no welds are needed to secure the perforated sleeve.

In yet another aspect, a method of servicing a filtration vessel is provided. In a first embodiment, the steps of the method comprise the following. An original perforated sleeve is removed from a filtration vessel that is mounted in a hole in a partition plate of the filtration vessel. A new perforated sleeve is installed into the hole in the partition plate. A new filter element is installed into sealing engagement with the new perforated sleeve.

The method may further have other steps. For example, an alignment member is inserted through the hole and through an alignment hole in a back support grid of the filtration vessel. A replacement perforated sleeve is slid along the alignment member until the perforated sleeve contacts the back support grid. The alignment member is removed from the filtration vessel. The replacement sleeve is fastened to an outer periphery of the hole.

In a preferred embodiment, the step of removing comprises grinding off an annular weld formed between the original perforated sleeve and the hole. In an alternative embodiment, the step of removing comprises unscrewing the perforated sleeve from threaded engagement with the back support plate.

In another preferred embodiment, the step of sliding further comprises inserting a hollow projection extending from the replacement perforated sleeve into the alignment hole.

In another preferred embodiment, the step of fastening comprises forming an annular weld between the replacement perforated sleeve and the partition plate. In an alternative embodiment, the step of fastening comprises screwing the replacement perforated sleeve into the back support grid.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
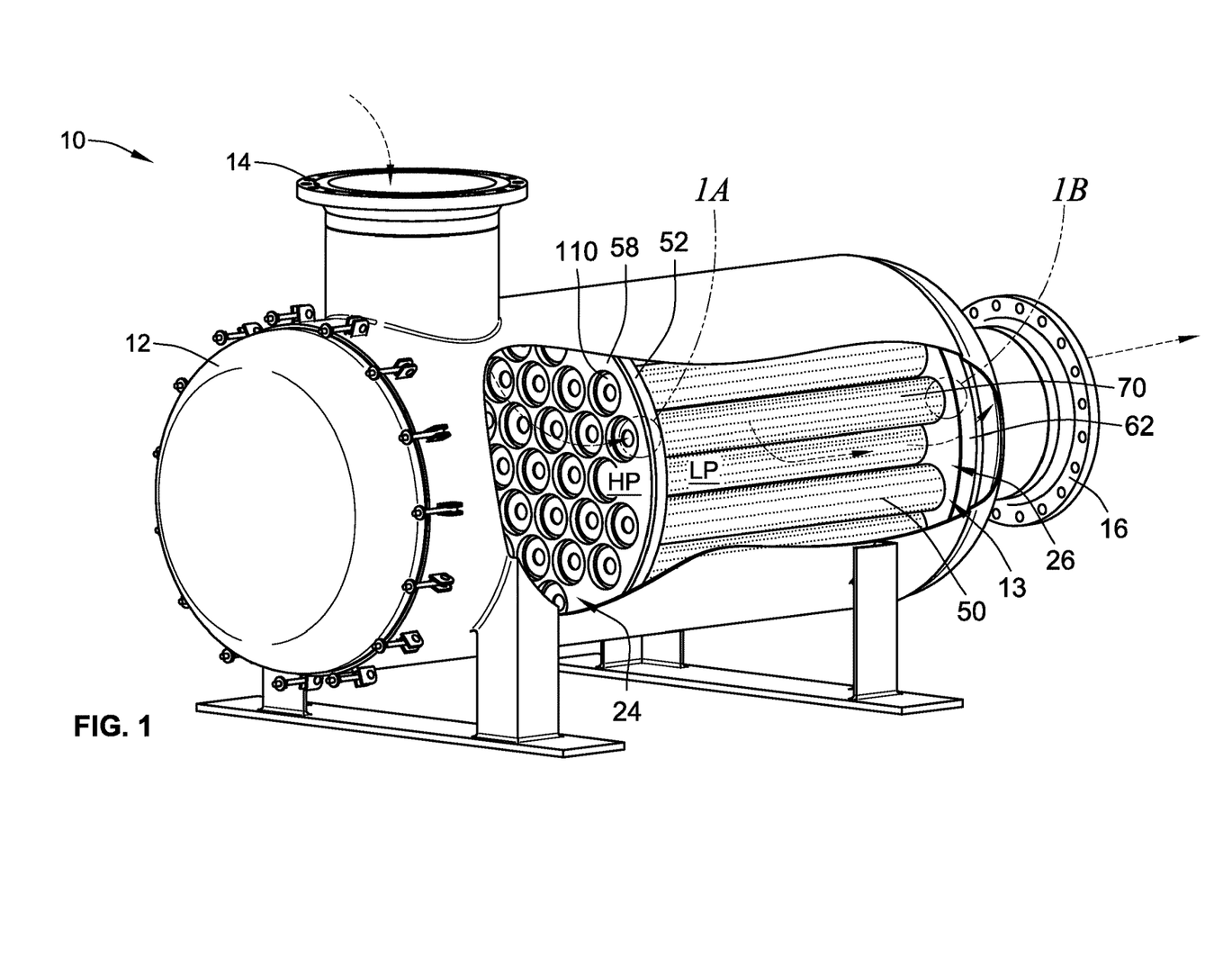
FIG. 1 is a perspective view of a filtration vessel known in the prior art.
Figure 1A:
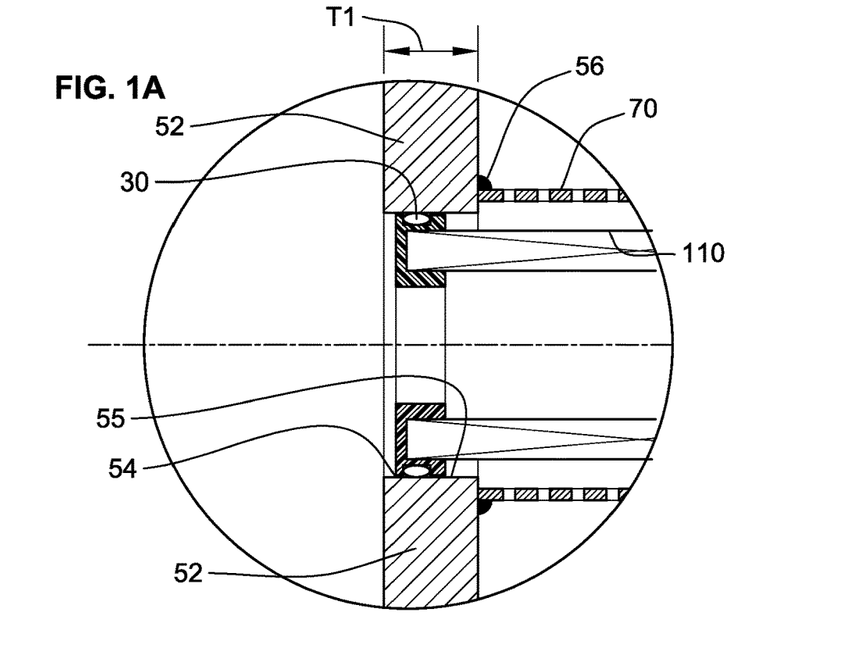
FIGS. 1A and 1B are cross-sectional views of a perforated sleeve utilized in the filtration vessel of FIG. 1.
Figure 1B:
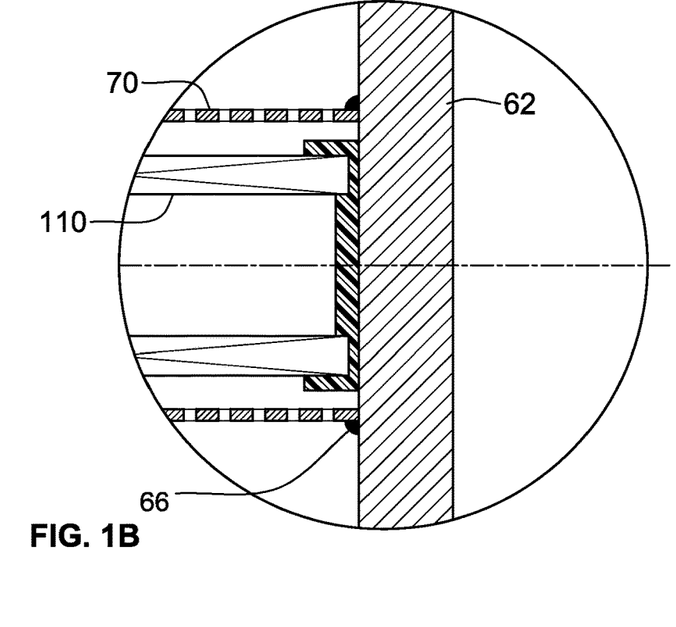

FIGS. 1, 1A, and 1B depict a filtration vessel 10 known in the prior art. The filtration vessel 10 has an outer housing 12 with an inlet port 14 and an outlet port 16, and defines a filtration chamber 13. A filter support structure 50 is disposed within the outer housing 12. The filter support structure 50 has a partition plate 52, which divides the filtration chamber 13 into an inlet compartment 24 and an outlet compartment 26. The partition plate 52 has a plurality of flow openings 54. From each flow opening 54, a first end of a corresponding perforated sleeve 70 extends into the outlet compartment 26 and terminates at a second end, attached to a back support plate 62. Each perforated sleeve 70 is adapted to receive a filter element 110.

The partition plate 52 defines a plurality of radial sealing surfaces 55 along an inner periphery of each flow opening 54. As such, a seal such as an o-ring 30 retained by a first end cap of each filter element 110 attempts to seal the filter element 110 to the partition plate 52. A good sealing relationship is required to prevent contaminated fluid in the inlet compartment 24 from bypassing the filter elements 110 and moving into the outlet compartment 26. However, for reasons discussed below, a good seal is often difficult to achieve in known filtration vessels.

The filtration vessel 10 is typically adapted to filter fluid at differential pressures from 30 to 50 PSID. These high differential pressures tend to axially compress the filter element 110 against the back support plate 62. Due to this compression, the first end cap of the filter element 110 and therefore the o-ring 30 move axially along the sealing surface 55. A typical filter element 110 can compress up to 1 inch or more. In order to accommodate for this compression and still ensure a good sealing relationship, the a partition plate 52 has a thickness T1 of at least 1.5 inches to 2.5 inches. This thickness T1 ensures that, even when the filter element 110 is compressed, the o-ring can still form a seal with the sealing surface 55.

The filter support structure 50 may also include a retaining plate 58, which is configured with flow openings having a smaller diameter than an diameter of the filter element 110. Thus, the retaining plate 58 helps to prevent the filter elements 110 from being unseated from their respective perforated sleeves 70 when the fluid flow reverses, such as it may during pipe depressurization. The retainer plate may be fastened to the partition plate by a variety of methods, including fasteners such as nuts and bolts, or one or more welds.

Because the partition plate 52 provides a sealing surface 55, the flow openings 54 must be carefully machined along the entire depth of the hole as the seal may slide axially due to the compression noted above. Imperfect machining results in a poor sealing surface, which may allow contaminated fluid to bypass the filter elements 110. O-ring gaskets typically have difficulty sealing to imperfectly manufactured sealing surfaces. For example, o-ring gaskets can have sealing problems and therefore allow some leakage if the sealing surface is even 0.0005 inches out of round, or has an actual diameter even 0.010 inches outside a design tolerance of the diameter. O-ring gaskets are also known to allow leakage if the sealing surface has a roughness of about 32 micro-inches or greater. Thus, great expense is usually incurred in making sure the sealing surface 55 is carefully machined along its entire depth. Even a perfectly manufactured sealing surface, however, can become damaged over time, and may make it difficult for an o-ring to provide a suitable seal.

Also, the partition plate 52 is typically made out of a costly material such as stainless steel. The size and expense of creating the partition plate 52 are often therefore undesirably high.

In order to prevent the perforated sleeve 70 from moving under the high fluid pressures, the perforated sleeve 70 is typically welded to the partition plate 52 at a first annular weld 56, and also to the back support plate at a second annular weld 66. Therefore, when a sleeve 70 needs to be replaced due to normal wear and tear, the replacement process can also be cost prohibitive. In order to remove the sleeve 70, the outer housing 12 must often be cut in half so that the first and second annular welds 56, 66 can be ground off. In many cases, the entire outer housing 12 must be replaced with a new one, making maintenance very costly.

Turning now to FIGS. 2, 2A, 2B, and 2C, an embodiment of a filtration vessel 100 having improvements over the prior art is discussed. Similar to the prior art, the filtration vessel 100 includes an outer housing 112 with an inlet port 114 and an outlet port 116, and defines a filtration chamber 113. A partition plate 152 divides the filtration chamber 113 into an inlet chamber 124 and an outlet chamber 126. Perforated sleeves 170 extend from the partition plate 152 to a back support grid 162 disposed within the outlet chamber 126, and receive the filter elements 110 therein. Similarly to filtration vessels in the prior art, the filtration vessel 100 may also include a retainer plate that is substantially similar to the retainer plate 58; however a retainer plate is not shown in the embodiment of the filtration vessel 100. Filter elements 110 are retained in respective perforated sleeves 170. Each filter element 110 includes an open end cap 104 (see FIG. 2A) and a closed end cap 106 (see FIG. 2C), and filter media extending therebetween.

In a preferred embodiment, each perforated sleeve 170 has a solid ring portion 172 along an inner peripheral surface of a first end proximate the partition plate 152. The solid ring portion 172 provides a radial sealing surface for the filter element 110. To accommodate for the compression of the filter element 110 discussed above, the solid ring portion 172 preferably extends along an axial length L between 1.5 inches and 2.5 inches or more (typically at least 1 inch). As such, the radial sealing surface in this preferred embodiment is provided by the perforated sleeve 170 rather than the partition plate 152.

Several benefits result from the perforated sleeve 170 providing a sealing surface for the filter element 110. First, the partition plate 152 may be made with a thickness T2 that is substantially less than the width of partition plates of the prior art, because it no longer needs to compensate for the compression of the filter element 110. The thickness T2 is preferably between 0.325 inches and 2.625 inches, and more preferably about 1 inch, although any suitable thickness may be used. Second, the partition plate 152 may be made of a less expensive suitable material such as carbon steel. Third, the flow openings 154 do not need to be machined, but can be formed with less costly manufacturing processes such as stamping, torch cutting, or cutting with a water jet.

The perforated sleeve 170 is preferably made from a suitable metal between 14 and 20 gauge, and more preferably 16 gauge. The perforated sleeve 170 is preferably made from stainless steel and may be formed from sheet material, and may be manufactured in a variety of ways, including drawing or forming. These manufacturing methods may result in a sealing surface that is not perfectly round, or has a diameter outside a design tolerance diameter of the sealing surface. In order to further improve the sealing relationship between the filter element 110 and the perforated sleeve 170, a seal such as a chevron seal 310 may be used (see FIG. 2A). The chevron seal may allow the provision of a less accurate and less precise sealing surface thereby accommodating a less accurate hole that may be afforded by the sleeve.

A chevron seal in this context is meant to refer to any seal having an annular mounting base portion which is retained by an end cap of the filter element 100, and an annular sealing portion which is disposed either radially inside or radially outside the annular base portion. The annular sealing portion typically extends at a canted angle from the annular base portion, forming a pocket therebetween. This pocket beneficially utilizes the differential pressure of filtration vessels such as the filtration vessel 100 to urge a greater sealing relationship. Chevron seals provide several advantages over a standard seal such as an o-ring due to due the sealing problems common to o-rings, discussed above.

Figure 2:
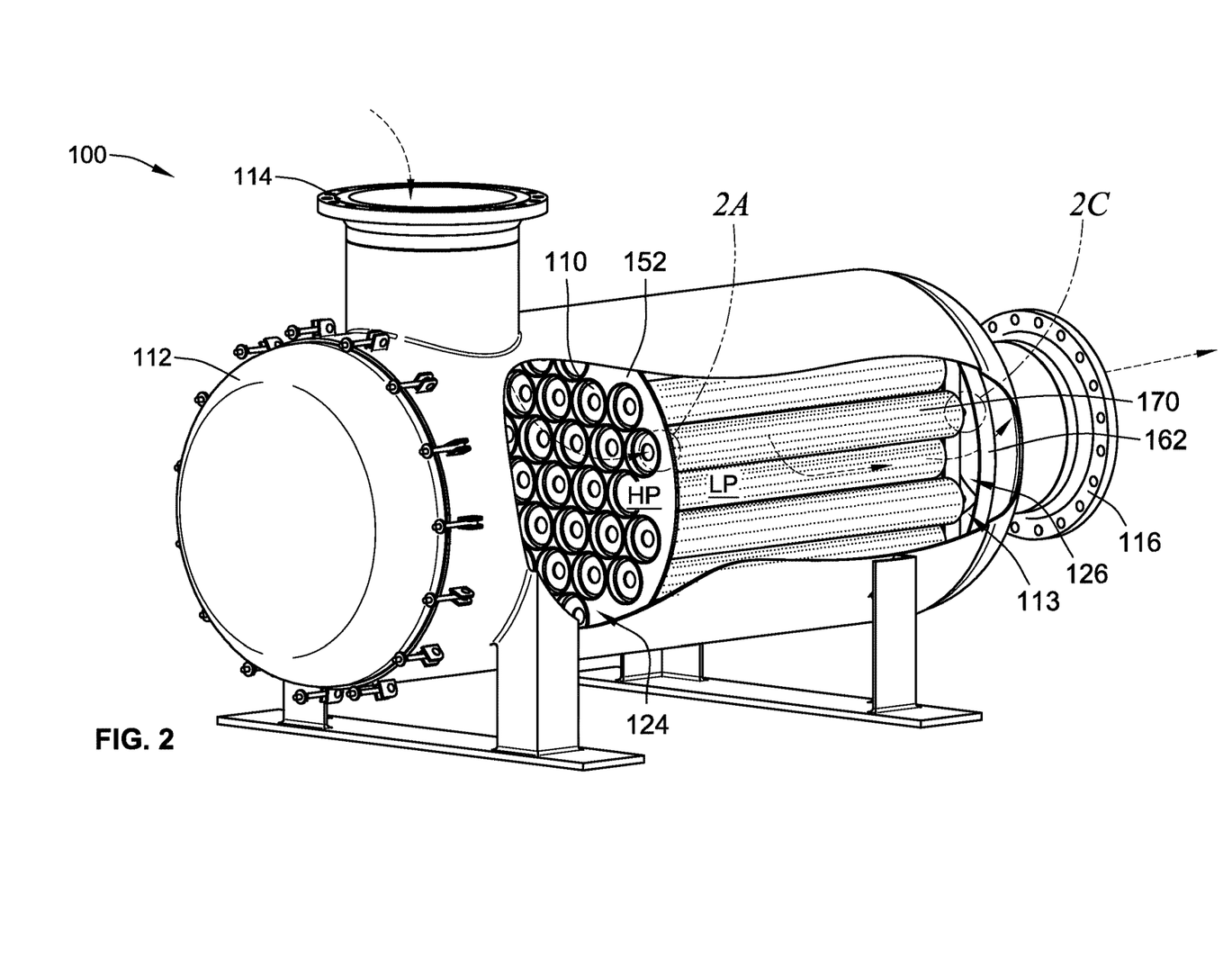
FIG. 2 is a perspective view of an embodiment of a filtration vessel according to the teachings of the present invention.
Figure 2A:
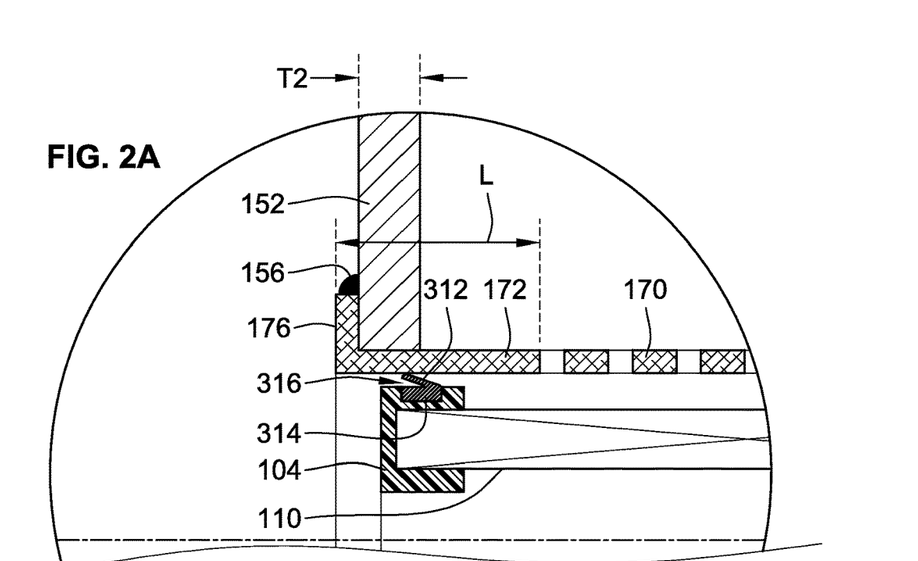
FIG. 2A is a cross-sectional view of a first end of a perforated sleeve and filter element utilized in the filtration vessel of FIG. 2.
Figure 2B:
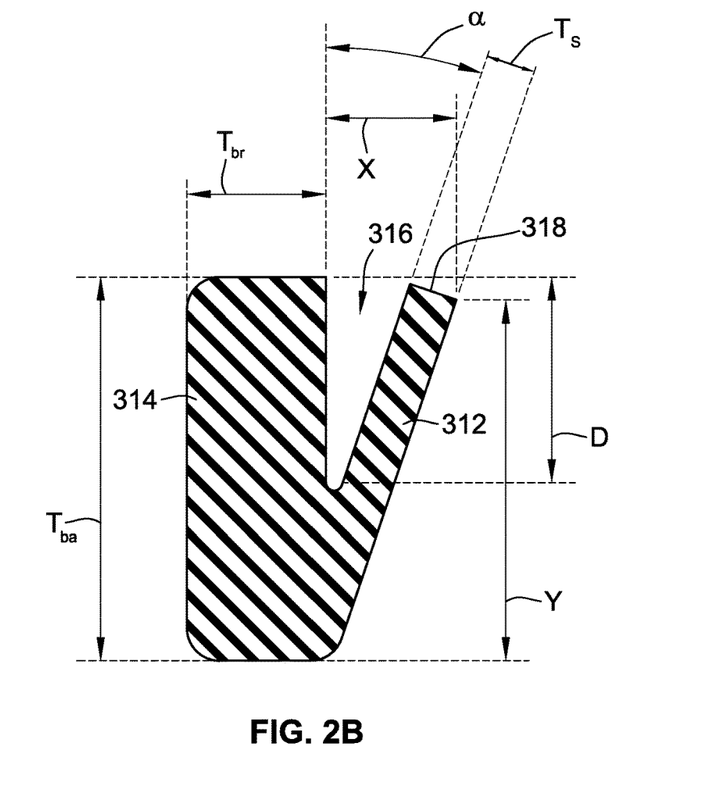
FIG. 2B is a cross-sectional view of a chevron gasket used in the filter element of FIG. 2A.
Figure 2C:
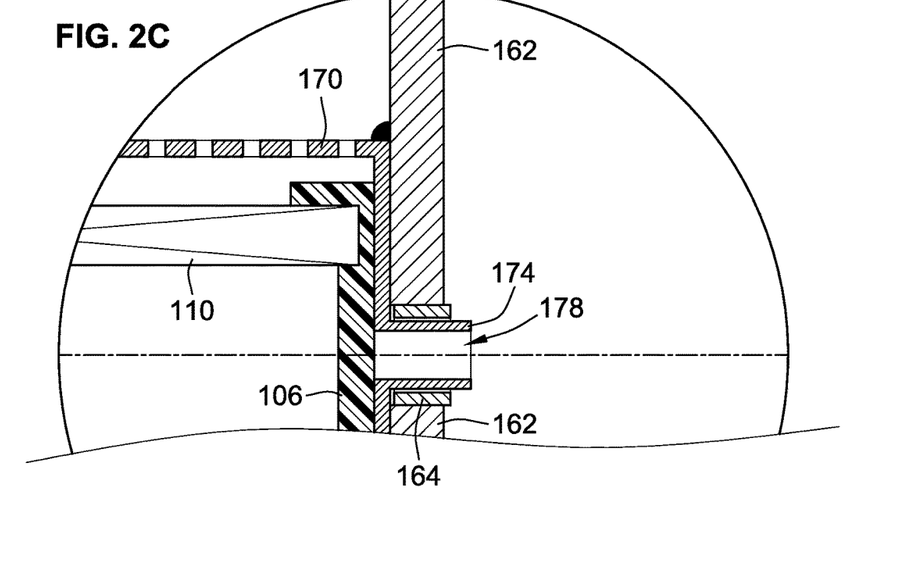
FIG. 2C is a cross-sectional view of a second end of the perforated sleeve and filter element of FIG. 2A.

Referring now to FIGS. 2A and 2B, the structural details of the chevron seal 310 are discussed. The chevron seal 310 is wedged tightly into a groove on an open end cap 104 of the filter, positively engaging all three sides when mounted thereon. The chevron seal 310 has an annular sealing flange 312 and an annular base portion 314, defining a pocket 316 therebetween, which opens at an angle α.

The chevron seal 310 has an inner diameter adapted to be retained by the outwardly opening groove of the filter element 110. In a preferred embodiment, the chevron seal 310 has an outer diameter with a design tolerance variance of up to 5% of the total outer diameter. Preferably, a diameter of an inner peripheral surface of the solid ring portion 172 is smaller than the outer diameter of the chevron seal 310 and larger than a diameter of the outer peripheral surface of the end cap on the filter element 110. As such, when the filter element 110 is received within the perforated sleeve 170, the chevron seal 310 is in a radially compressed state.

In a preferred embodiment, the annular base portion 314 has an axial thickness Tba of between 0.1 inches and 1.5 inches, and a radial thickness Tbr of between 0.1 inches and 1 inch. The annular sealing flange 312 has a thickness Ts of between 0.02 inches and 0.25 inches. A terminating end 318 of the annular sealing portion 312 is radially spaced from the annular base portion 314 by a distance X of between 0.1 inches and 1.25 inches. The annular sealing flange 312 spans a longitudinal length Y of between 0.1 inches and 1.25 inches. The angle α of the pocket 316 is between 10 degrees and 85 degrees, and the pocket 316 has an axial depth D of between 0.1 inch and 1 inch.

The chevron seal 310 is preferably made from an appropriate sealing material such as buna-n (nitrile), fluoropolymer, silicone, fluorosilicone, or EPR (ethylene propylene rubber), although other appropriate sealing materials are contemplated. A preferred embodiment of the chevron seal 310 has a Shore A durometer of between 30 and 80.

The pocket 316 of the chevron seal 310 is arranged relative to the filtration vessel 100 such that it opens towards the area having the higher fluid pressure—in the embodiment shown in FIG. 2, the inlet area 24. In this advantageous orientation, the high pressure fluid exerts pressure inside the pocket 316 on both the annular sealing flange 312 and the annular base portion 310. This pressure urges the pocket 316 open, causing further radial sealing engagement between the annular sealing flange 312 and the solid ring portion 172, as well as between the annular base portion 314 and the end cap of the filter element 110. The radially compressed state of the chevron seal 310 and the beneficial orientation of the pocket 316 helps prevent fluid in the inlet area 24 from bypassing the filter, even when the solid ring portion 172 is not perfectly round, or is slightly out of tolerance.

The preferred characteristics of the chevron seal 310 allow the filter element 110 to form a seal with an imperfectly manufactured sealing surface. A method of measuring variance from round in an opening involves measuring the maximum and minimum diameters of an opening with a measuring tool such as a set of calipers, and subtracting the minimum diameter from the maximum diameter. The chevron seal 310 is adapted to seal to openings with up to at least 0.25 inches variance from round in preferred embodiments, and certainly better than typical O-ring gaskets that may be prone to sealing problems with non-round surfaces.

The preferred characteristics discussed above also allow the filter 110 having a chevron seal 310 to form a seal with a generally round opening that is formed having a diameter that is at least up to 0.125 inches outside a design diameter of the opening, and certainly greater than the 0.01 inches that is reliably provided by an O-ring. A filter 110 having a chevron seal 310 can also form a seal with a generally round opening that has a surface roughness of at least up to 90 micro-inches, and certainly greater than the typical o-ring maximum roughness of 32 micro-inches.

Thus, the filter element 110 in the filtration vessel 100 preferably retains a chevron seal 310 on its end cap in order to form a good sealing relationship with the perforated sleeve 170. Other suitable seals, however, such as an o-ring or a wiper seal may be used.

Figure 3:
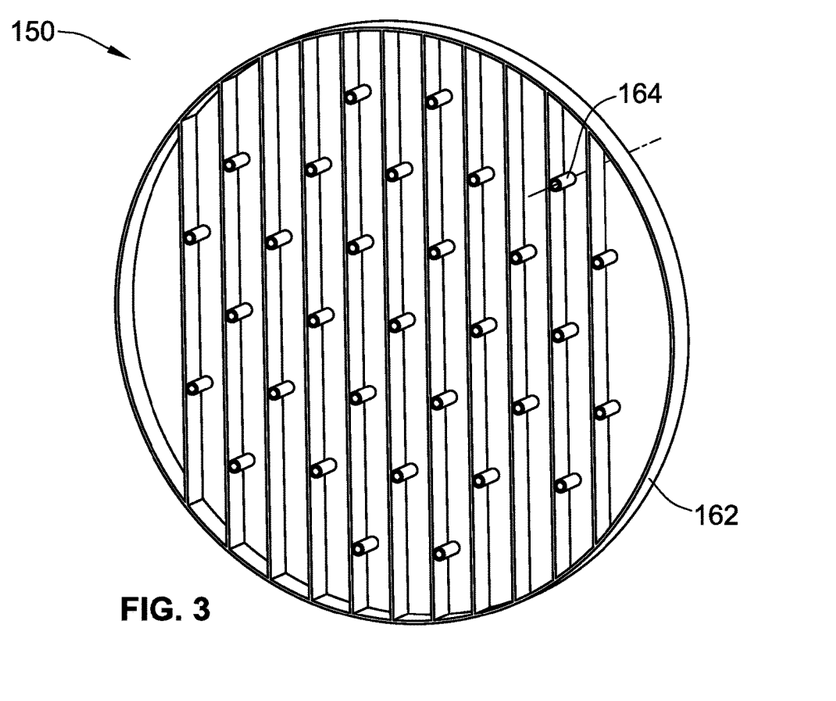
FIG. 3 is a perspective view of a back support grid used in the filtration vessel of FIG. 2.

In a preferred embodiment, the perforated sleeve 170 further comprises an alignment structure such as the projection 174, which is adapted to slidably and removably engage an alignment structure such as an alignment hole 164 in a back support grid 162 of the element support structure 150 (see FIG. 3). In a more preferred embodiment, the projection 174 is generally hollow such that a through hole 178 extends from the interior of the perforated sleeve 170 through the projection 174. This through hole 178 aids in the alignment of the perforated sleeve 170 during installation, as will be discussed in more detail below.

The particular structural characteristics of the back support grid 162 are merely one embodiment of many suitable and contemplated configurations. Any configuration that sufficiently locates and supports the alignment holes 164 is contemplated, including but not limited to a solid plate having a plurality of alignment holes, or a generally lattice-shaped pattern defining alignment holes at an intersection of the lattice members.

Moreover, the combination of a projection formed on a perforated sleeve with an alignment hole formed in a back support grid is just one of many contemplated embodiments of removably engaging interlocking forms for engaging the perforated sleeve 170 with the back support grid 162. For example, a projection could be formed on the back support grid 162, and an alignment hole could be formed on the perforated sleeve 170. In other embodiments, a series of tabs may be adapted to interlock with a series of corresponding apertures. The slidably removable engagement features of the projection 172 and the alignment hole 164 allow for a damaged perforated sleeve 170 to be removed and replaced without having to damage the outer housing 112, as discussed in more detail below.

In one embodiment, the perforated sleeve 170 further comprises a flange 176 that is attached to the partition plate 152 at an annular weld 156. When the perforated sleeve 170 is desired to be removed from the outer housing 112, the annular weld 156 is ground off. The perforated sleeve 170 may then be slid through the flow opening 154 and out of the outer housing 112.

Figure 4A:
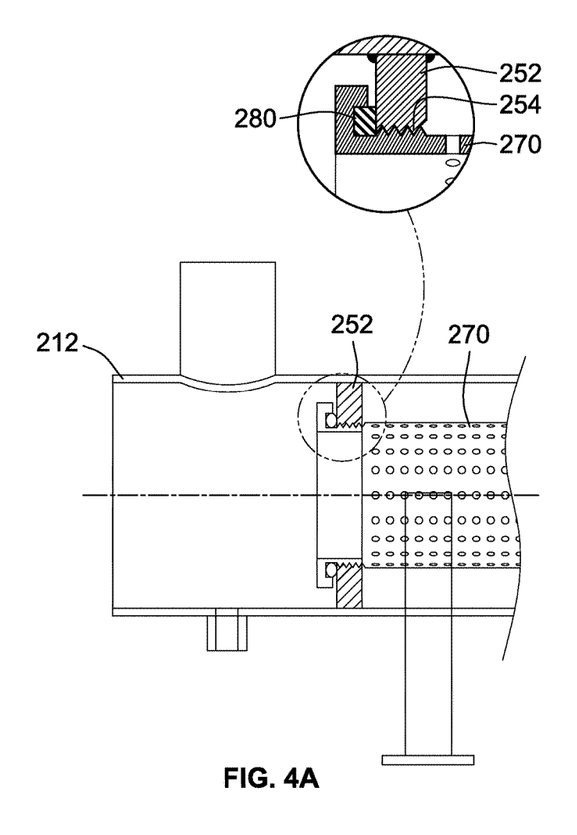
FIGS. 4A and 4B are cross sections of portions of alternative embodiments of the filtration vessel of FIG. 2, showing mounting of the perforated sleeve and threaded fastening of the guide projection at opposing ends, respectively.
Figure 4B:
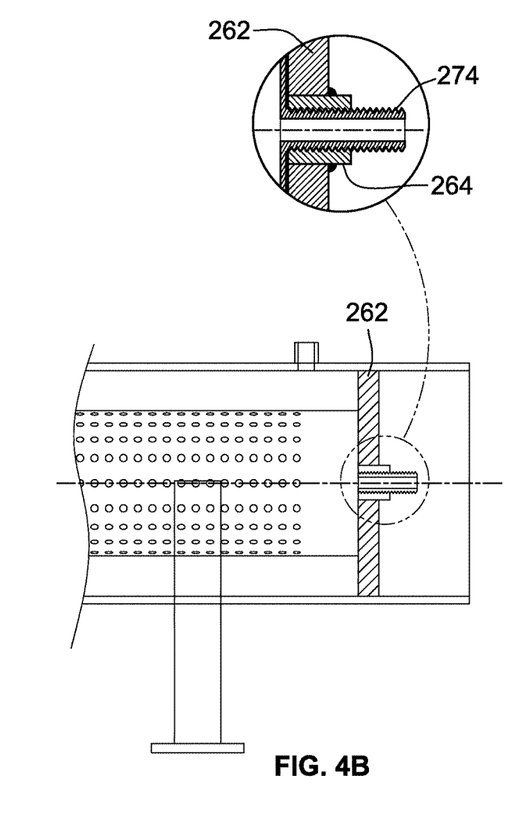

In an alternative embodiment, shown in FIGS. 4A, and 4B, alternative connections between a perforated sleeve 270 and a partition plate 252, and between the perforated sleeve 270 and a back support grid 262 are provided. In one embodiment, the projection 274 defines an interlocking form such as a threaded portion, which is adapted to engage a threaded alignment hole 264, as shown in FIG. 4B. In another embodiment, a threaded portion of the perforated sleeve 270 threadably engages a flow opening 254, as illustrated in FIG. 4A. In various suitable embodiments, the threaded engagement shown in FIG. 4A or 4B may be used, or both may be used in one embodiment. In any of these various embodiments, an axial sealing surface for sealing between the partition plate 252 and the perforated sleeve 270 is provided at a first face of the partition plate 252. A seal such as a flat gasket 280 axially seals the perforated sleeve 270 at a flange 276 to the first face of the partition plate 252. An embodiment having one of the various threaded engagements discussed above in addition to the flat gasket 280 will not require an annular weld between the partition plate and the flange. These alternative arrangements help reduce the time and cost of servicing a perforated sleeve 270 because no weld needs to be ground off for the perforated sleeve 270 to be removed.

In addition to a threaded engagement between the perforated sleeve 270 and the alignment hole 264 or partition plate 252, other suitable interlocking forms are contemplated. For example, a combination of twist fit and catching interlocking forms may be arranged on the perforated sleeve 270 and the back support grid 262 or the partition plate 252, such that the perforated sleeve 270 may be twisted into place and then locked in position.

Having described the structural attributes of various embodiments of the present invention, and with reference to the FIGs. generally, a method of servicing a filtration vessel will be discussed. In a first embodiment of a method, the annular weld 156 is ground off. Because the projection 174 is slidably engaged with the alignment hole 164, no additional tools or unfastening work is required at the connection between the perforated sleeve 170 and the back support grid 162. The perforated sleeve 170 that is desired to be serviced or replaced is pulled through its corresponding flow opening 154. An alignment member such as a rod 190 is inserted through the flow opening 154 in the partition plate 152, and through the corresponding alignment hole 164 in the back support grid 162 (see FIG. 5). The rod 190 is inserted into the replacement perforated sleeve 170 through the through hole 178.

Figure 5:
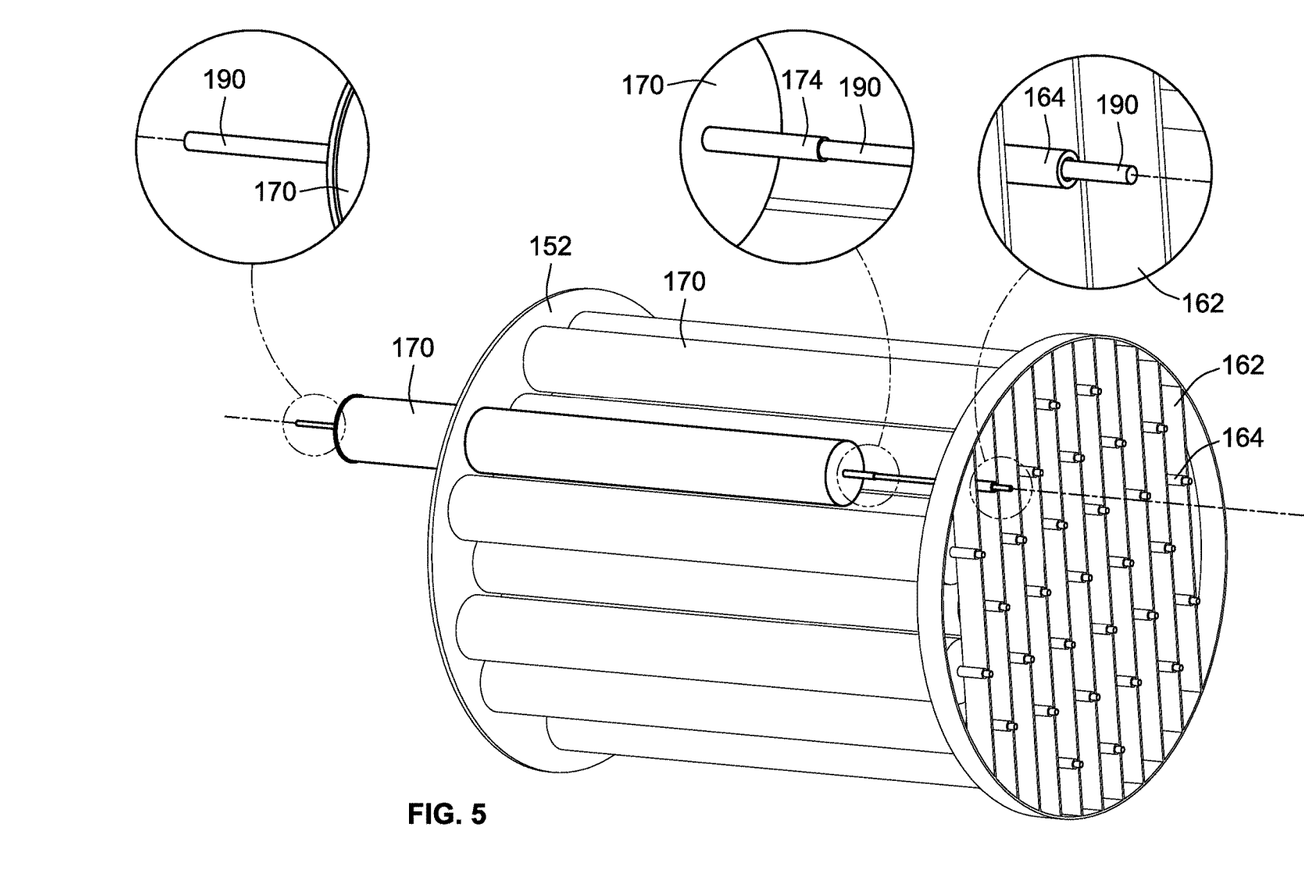
FIG. 5 is a perspective view illustrating an embodiment of a method of servicing a filtration vessel.
Figure 6:
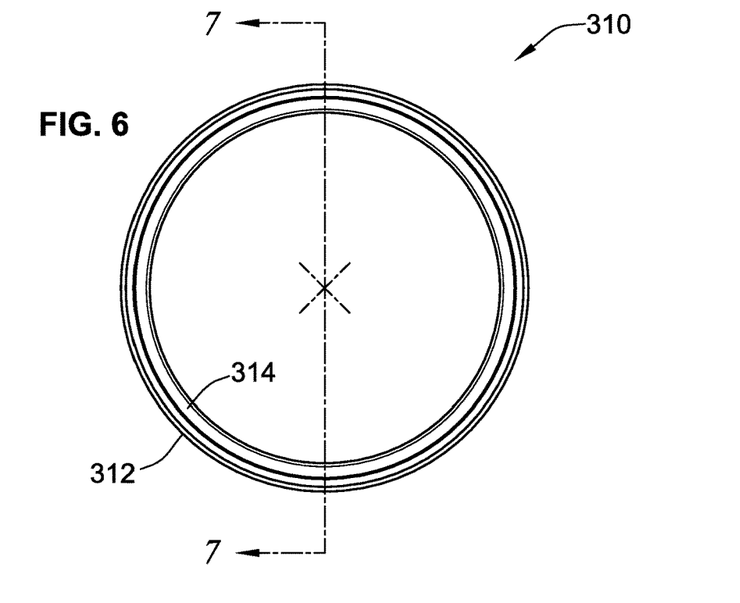
FIGS. 6-8 are views of a chevron seal used in the filtration vessel of FIG. 2.
Figure 7:
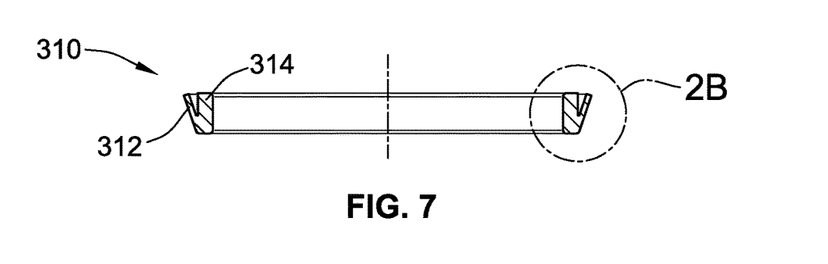
Figure 8:
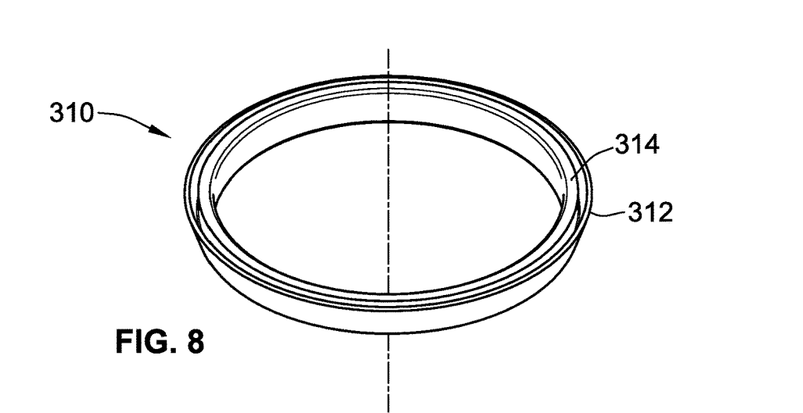

The replacement perforated sleeve 170 is slid along the alignment member until it contacts the back support grid 162. The projection 174 is then inserted into the alignment hole 164. The alignment rod 190 is removed from the alignment hole 164, through the through hole 178, and out of the outer housing 112 through the flow opening 154. The replacement perforated sleeve 170, now slidably engaged with the back support grid 162, is then welded at its flange 176 to the partition plate 152.

In a alternative method, the servicing of a filtration vessel does not require the steps of grinding off an annular weld or re-welding a replacement perforated sleeve. In this alternative method, an original perforated sleeve 270 is unthreaded from a threaded engagement with the partition plate 252. The perforated sleeve 270 is slid out of the outer housing 212 through a flow opening 254. A replacement perforated sleeve 270 is then slid back into the outer housing using an alignment member such as a rod in the same manner discussed in the previous embodiment. When the replacement perforated sleeve 270 is slidably engaged with a back support grid 262, it is threaded into threaded engagement with the partition plate 152. The flat gasket 280 axially seals the replacement perforated sleeve 270 to the partition plate 252 when it is axially compressed between the flange 276 and the partition plate 252.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filtration vessel, comprising:
   an outer housing defining a filtration chamber, the housing having an inlet port and an outlet port;
   a partition plate in the housing dividing the filtration chamber into an inlet chamber communicating with the inlet port and an outlet chamber communicating with the outlet port;
   a hole defined in the partition plate;
   a sleeve mounted in the hole in the partition plate, the sleeve having a solid ring portion lining the hole to provide a radial seal surface, the solid ring portion lining the hole such that the radial seal surface extends through the hole in the partition plate, and the sleeve further having an apertured portion with a plurality of flow apertures, the solid ring portion securing the apertured portion to the partition;
   a filter element removably installed into the sleeve, the filter element having a seal sealing radially against the radial seal surface.

2. The filtration vessel of claim 1, wherein the sleeve is a perforated sleeve providing the solid ring portion and the apertured portion, and wherein a plurality of holes, perforated sleeves, and filter elements are provided, each perforated sleeve mounted in one of the holes and each filter element mounted in one of the sleeves.

3. The filtration vessel of claim 1, wherein the partition plate has a thickness that is between 0.375 inches and 2.675 inches.

4. The filtration vessel of claim 1, wherein the partition plate has a thickness that is less than 1.5 inches.

5. The filtration vessel of claim 1, wherein the seal has an annular sealing flange and an annular base portion, the annular base portion carried by a first end cap of the filter element, and with the annular sealing flange having an annular terminating end spaced either radially inside an inner peripheral surface of the first end cap or radially outside an outer peripheral surface of the first end cap, wherein the seal is elastomeric with sufficient resiliency and flexibility to conform and seal to a non-round opening with up to at least 0.01 inches in a diameter variance from round.

6. The filtration vessel of claim 5, wherein the seal conforms to a generally round opening having a diameter up to at least 0.125 inches outside a design diameter of the radial seal surface.

7. The filtration vessel of claim 5, wherein the seal conforms to a non-round opening with up to at least 0.25 inch in a diameter variance from round.

8. The filtration vessel of claim 1, wherein an annular weld is formed between the solid ring portion and the partition plate thereby mounting and sealing the sleeve in the hole.

9. The filtration vessel of claim 1, wherein the sleeve is a perforated sleeve, further comprising a back support grid, wherein the back support grid further comprises a first alignment structure, and the perforated sleeve further comprises a second alignment structure, and the first alignment structure is adapted to receive the second alignment structure.

10. The filtration vessel of claim 9, wherein the first and second alignment structures are threaded, such that the perforated sleeve screws into the back support grid.

11. The filtration vessel of claim 10, further comprising a seal, wherein the seal is a flat gasket providing an axial seal between the perforated sleeve and the partition plate.

12. The filtration vessel of claim 1, wherein the sleeve is a perforated sleeve having a perforated portion extending from the solid ring portion, the solid ring portion extends between 1.5 inches and 2.5 inches along the perforated sleeve, the perforated portion extending between 2 and 80 inches.

13. The filtration vessel of claim 12, wherein the filter element has an outer diameter of between 2 inches and 10 inches, and a length of between 4 inches and 80 inches.

14. The filtration vessel of claim 13, wherein the perforated sleeve is made stainless steel having a gauge of between 14 and 20.

15. The filtration vessel of claim 1, wherein the hole is not machined but has a rough cut edge formed with one of the methods of stamping, torching, and cutting with a water jet.

16. The filtration vessel of claim 1, wherein the solid ring portion is connected to a flange, the flange extending radially outward and over an upstream face of the partition plate.

17. The filtration vessel of claim 1, wherein the apertured portion is non-removable relative to the partition plate without removal of the solid ring portion.

* * * * *